US012530610B2

(12) United States Patent
Le et al.

(10) Patent No.: US 12,530,610 B2
(45) Date of Patent: Jan. 20, 2026

(54) ROBUST QUANTUM COMPUTING

(71) Applicant: UNIVERSITY OF SURREY, Guildford (GB)

(72) Inventors: Nguyen Le, Camberley (GB); Eran Ginossar, Fleet Guildford (GB); Max Cykiert, Guildford (GB)

(73) Assignee: UNIVERSITY OF SURREY, Guildford (GB)

( * ) Notice: Subject to any disclaimer, the term of this patent is extended or adjusted under 35 U.S.C. 154(b) by 17 days.

(21) Appl. No.: 18/690,933

(22) PCT Filed: Sep. 9, 2022

(86) PCT No.: PCT/EP2022/075178
§ 371 (c)(1),
(2) Date: Mar. 11, 2024

(87) PCT Pub. No.: WO2023/036963
PCT Pub. Date: Mar. 16, 2023

(65) Prior Publication Data
US 2025/0139483 A1    May 1, 2025

(30) Foreign Application Priority Data
Sep. 9, 2021   (GB) ..................... 2112879

(51) Int. Cl.
*G06N 10/40*    (2022.01)
*G06N 10/20*    (2022.01)
*G06N 10/70*    (2022.01)

(52) U.S. Cl.
CPC ............. *G06N 10/40* (2022.01); *G06N 10/20* (2022.01); *G06N 10/70* (2022.01)

(58) Field of Classification Search
CPC ......... G06N 10/40; G06N 10/20; G06N 10/70
(Continued)

(56) References Cited

U.S. PATENT DOCUMENTS 10,622,536 B2 *   4/2020   Chow ................... G06N 10/40
2021/0035008 A1   2/2021   Gidney

OTHER PUBLICATIONS

Sameti, Mahdi, "Quantum simulation with periodically driven superconducting circuits", May 6, 2019, pp. 1-183 (Year: 2019).*
(Continued)

*Primary Examiner* — Tomi Skibinski (57) ABSTRACT

Robust optimal control techniques are provided that may shape driving pulses such that the gates are realised with high fidelity despite experimental uncertainty in all or some of the physical parameters of the qubits, drives, qubit-qubit coupling, and qubit-drive coupling. For example, a method for controlling a quantum system comprising a plurality of coupled qubits may comprise: i) assigning the qubits to a plurality of subgroups, wherein the assigning comprises selecting at least one driven qubit and a plurality of undriven qubits for each subgroup, such that each undriven qubit in a subgroup is coupled to a driven qubit in that subgroup and such that any two adjacent subgroups share at least one undriven qubit and do not share any driven qubit; and ii) applying drive signals to each driven qubit to implement a set of desired quantum gates at the driven qubits, wherein the application of the drive signals to the driven qubits at the same time implements the identity gate at each undriven qubit.

19 Claims, 6 Drawing Sheets

(58) Field of Classification Search
USPC .................................................. 327/527, 528
See application file for complete search history.

(56) References Cited

OTHER PUBLICATIONS

Sameti, Mahdi, "Quantum Simulation with Periodically Driven Superconducting Circuits", ROS Theses Repository. May 6, 2019. p. 1-183. Retrieved from the Internet: URL: https://www.ros.hw.ac.uk/handle/10399/3532.
International Search Report and Written Opinion from corresponding PCT Application No. PCT/EP2022/075178, dated Nov. 10, 2022.

* cited by examiner

ROBUST QUANTUM COMPUTING

FIELD

The present disclosure relates to quantum computing and in particular to the quantum computing systems having fixed couplings between a plurality of qubits. Control techniques are provided to apply quantum gates to such quantum computing systems.

BACKGROUND

Quantum computing represents a fundamental step change from conventional binary computing systems. In particular, by taking advantage of the superposition of quantum states in a physical system, the opportunity to hugely increase processing power in comparison to conventional computing systems is provided. However, extremely delicate management of the system and precise control of its dynamical degrees of freedom are necessary in order to control such quantum states, and while research to date has been able to demonstrate the power of quantum computing in principle, it remains challenging to provide a system which is both scalable and commercially viable.

The basic unit of many quantum computing systems is the quantum bit, or qubit, which may be placed in two discrete information bearing states, but unlike classical computing bits may also be in a superposition of those states. A quantum circuit is conceptualised as the application of a set of sequential operations (or "gates") to the qubits of a quantum computing system, which alter the state of the information stored in them. Ultimately this is done with the aim of obtaining a measurable outcome. Quantum gates of this kind can be applied individually to qubits or may be two (or more) qubit gates which are simultaneously applied to a set of the qubits. Gates are usually performed with control signals (or drive signals), which are required to bring about gates of high-fidelity, i.e. low error rates. There is usually only a limited time before stored information is lost and hence gates need also to be fast.

In a multi-qubit system there will be some element of coupling between the qubits, which are interactions which have a potential to cause energy exchange and modification of the quantum states. For example, natural interactions such as mutual induction, exchange between spins or dipole-dipole interactions between atoms may lead to such coupling. Moreover, in many quantum computing systems deliberate coupling is provided in order to facilitate the application of certain quantum gates (some of which are applied to multiple qubits simultaneously and take advantage of entanglement between the quantum states of those qubits). Often systems are designed to provide tunable coupling such that interactions between qubits can be appropriately controlled.

However, the complexity of tunable coupling adds to the overheads in fabrication and wiring a quantum computing system. This is particularly acute as the system is scaled up to incorporate an increased number of qubits, meaning that the requirement for tunable coupling can contribute to the technical challenges associated with scaling up such devices. It is predicted that many thousands of qubits will be needed for running even modest near future algorithms, making it an immense challenge to provide scalable control. Further challenges arise in controlling and characterising the system (hardware validation) since there is uncertainty associated with the physical parameters of the qubits and qubit-qubit coupling due to the variability in fabrication and diffusive processes in the materials. Precise characterisation and calibration of every qubit is a significant challenge, and in practice there is likely to be a degree of uncertainty against which all control processes need to be sufficiently robust in order to obtain high-fidelity gates.

SUMMARY

According to a first aspect of the disclosure, there is provided a method for controlling a quantum system comprising a plurality of coupled qubits, comprising:
i) assigning the qubits to a plurality of subgroups, wherein the assigning comprises selecting at least one driven qubit and a plurality of undriven qubits in each subgroup, such that each undriven qubit in a subgroup is coupled to a driven qubit in that subgroup and such that any two adjacent subgroups share at least one undriven qubit and do not share any driven qubits; and
ii) applying drive signals to each driven qubit to implement a set of desired quantum gates while simultaneously implementing the identity gate at each undriven qubit.

The state of the undriven qubits evolves in time due to the qubit-qubit coupling. Nevertheless, the identity gate can be applied on these undriven qubits by selectively applying driving signals to the driven qubits within each subgroup. A drive process can be created which may be robust to minor variations in the properties of the system arising from fabrication or material inconsistencies, environmental conditions, or the like. Through the described approach of assigning subgroups, robust drive signals can be developed which allow the application of desired gates to the driven qubits while leaving the state of the undriven qubits unchanged.

In particular, a robust optimal control may be provided that shapes the driving pulses such that the gates are realised with high fidelity despite experimental uncertainty in all or some of the physical parameters of the qubits, drives, qubit-qubit coupling, and qubit-drive coupling. Thus, for a given level of uncertainty a more robust outcome can be achieved. This may avoid or reduce the need to calibrate and characterise the quantum system before and during use to achieve a desired fidelity, thereby significantly increasing the rate at which valuable computations may be performed. As the scale of the system increases, benefits of this kind become more significant. In some examples, the drive signals are optimised for maximising the minimum or average value of the set of the gate fidelities calculated at the extreme points of the region of the uncertain parameters.

Since the drive signals can be effective to maintain the state of the undriven qubits by harnessing the qubit-qubit coupling, there is no need to provide tunable coupling between the qubits for this purpose. In particular, it is not necessary to decouple qubits in order to prevent the evolution of their quantum states since the drive signals actively apply the identity gate where necessary. As such, in some embodiments the coupling between some or all of the qubits is fixed. Nevertheless, tunable coupling may be adopted for some or all couplings if desired.

By assigning qubits in the described manner, it may be that the system's Hamiltonian can be decomposed into commuting blocks (subgroups) of only a few qubits. Each block can have a low dimensional Hilbert space and a small number of uncertain parameters, and thus its unitary evolution can be optimized efficiently using robust optimal control algorithms. That is, the qubit-qubit coupling may have a form such that the Hamiltonians of the subgroups mutually commute. As a result, the Hamiltonian of the whole system, including the drives and qubit-drive interaction, can be expressed as a sum of the commuting subgroup Hamiltonians.

The qubits may be capacitively coupled to one another. This may be in addition to or in alternative to other forms of coupling. In some embodiments, the coupling between the qubits comprises ZZ coupling, or any coupling which commutes with the qubit's free evolution Hamiltonian. This may be beneficial in the development of robust drive signals.

In general, the plurality of qubits may have the physical shape of a network with any dimensionality or connectivity. For example, the plurality of qubits may be a 2D array of qubits or an array of qubits of any other dimension. It may be, for example, a hexagonal (honeycomb) array or a square array with qubits at the vertices. In other examples, the array may be a 1D array.

A quantum circuit typically comprises the application of a plurality of gates to a set of qubits in sequence. The method may comprise repeating steps i) and ii) to implement a further set of desired quantum gates. It is not necessarily the case that the same qubits will be used as driven and undriven qubits when the steps are repeated to apply subsequent gates. For example, repeating step i) may comprise selecting different driven qubits.

The drive signals may be applied without interruption. For example, where steps i) and ii) are repeated, the drive signals from an earlier iteration of step ii) continue to be applied until the drive signals from a subsequent iteration are themselves applied. Where there is a gap between the application of the drive signals it may be minimised as far as practically possible. This may avoid unwanted evolution of the quantum states of the qubits.

The set of desired quantum gates may comprise at least one of: the Hadamard gate, the $\pi/8$ gate, the identity gate and the CNOT gate. Alternatively or additionally, the desired quantum gates may comprise the Z gate (e.g. the Pauli- or parametric-Z gate) and/or the X and/or Y gates. Other quantum gate may also be comprised by the set or desired quantum gates. Together, a wide range of quantum circuits can be produced using these gates and combinations thereof. In many embodiments, the set of desired quantum gates will comprise at last one two-qubit gate, but this is not necessary in all embodiments.

The method may further comprise measuring the states of at least one of the qubits. In this way, an output may be obtained from the system.

In some examples, the drive signals which are applied to the driven qubits are obtained by: generating a representation of the quantum system; defining a region reflecting a range of uncertainty for one or more parameters of the quantum system; identifying, for a point within the region, initial drive signals for which a calculated fidelity is maximised using the representation; identifying, simultaneously for a plurality of points on the boundary of the region, final drive signals for which a calculated fidelity is maximised using the representation and the initial drive signal, wherein the final drive signals are applied to the driven qubits.

Indeed, this process for obtaining drive signals is novel in itself, and so according to a further, independent, aspect of the present disclosure, there is provided a method for a obtaining drive signals to be applied to a quantum system comprising a plurality of qubits, the method comprising: generating a representation of the quantum system; defining a region defined by a range of uncertainty for one or more parameters of the quantum system; identifying, for a point within the region, initial drive signals for which a calculated fidelity is maximised using the representation; identifying, simultaneously for a plurality of points on the boundary of the region, final drive signals for which a calculated fidelity is maximised using the representation and the initial drive signal, wherein the final drive signals are applied to one or more qubits.

The representation of the quantum system may be a tensor network representation. This has been found to be advantageous in some complex systems, but in some embodiments alternative representations of the quantum system may be adopted for the purpose of the method.

This approach allows the fidelity of the quantum operation to be robust to variations in the parameters of the quantum system, which may be unknown or vary over time in an unpredictable manner. By initially identifying initial drive signals based on a point with a region of parameter uncertainty (for example, at a centre point of this region) and then subsequently using these initial drive signals to obtain the final drive signals the process can help to ensure adequate fidelity across the entire region. In this context, the range of uncertainty or the parameters, and the region reflecting this, may be user-defined or selected.

Optionally, the method further comprises calculating the fidelity with the final drive signals at one or more further points within the region; and determining a distribution of the fidelity across the region from the calculated fidelities.

This may allow the robustness of the drive signals to be verified, for example, prior to their application. In this manner, observed results or behaviour of the quantum system may be better understood with a fuller understanding of their likely accuracy.

The step of identifying the initial drive signals may comprise utilising a gradient ascent/descent method. Such techniques can allow for the identification of optimal control signals given a particular set of parameters.

In some examples, the step of identifying the final drive signals comprises utilising a gradient ascent/descent method starting from the initial drive signals. By adopting such a method starting from an optimised drive signal within the region of parameter uncertainty, it is likely that the final drive signals will also provide good fidelity throughout the region.

The qubits may be superconducting qubits and may, for example, be transmon qubits.

According to a further aspect, there may be provided a computer program product comprising computer executable instructions which, when executed by one or more processors, cause the one or more processors to carry out the methods of the earlier aspects. There may also be provided an implementation comprising one or more processors configured to carry out these methods.

BRIEF DESCRIPTION OF THE FIGURES

Embodiments of the present disclosure are now described with reference to the accompanying Figures, in which:

FIG. 1b illustrates a quantum circuit which may be applied to the quantum system of FIG. 1a;

FIG. 3 shows a derived optimal pulse shape for the application of a Hadamard gate on the driven qubit of the 4-qubit subgroup in FIG. 2a;

DETAILED DESCRIPTION

Figure 1A:
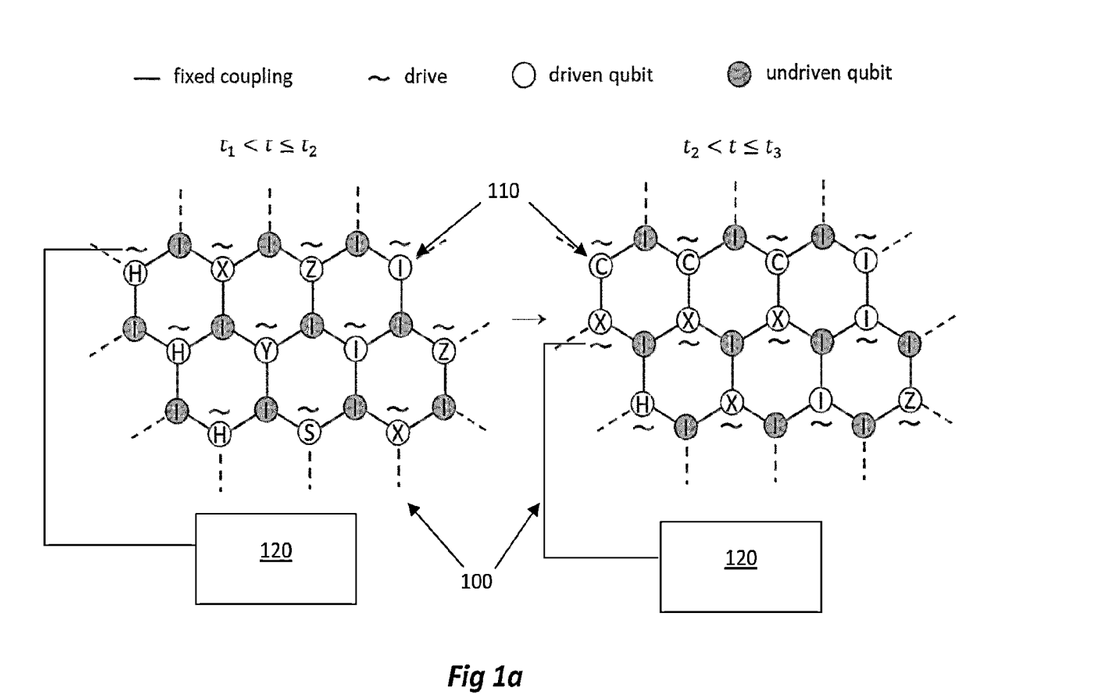
FIG. 1a illustrates a quantum system comprising an array of qubits and external drives

Referring to FIG. 1a, there is shown a quantum system 100 at a first time period/step (between times $t_1$ and $t_2$) on the left and a second time period/step (between times $t_2$ and $t_3$) on the right. The quantum system comprises an array of coupled qubits 110 and external drives 120 forming part of a quantum computing system. The drives 120 implement a set of quantum gates on the qubit array by applying control/drive signals to driven qubits within the array. In the example of FIG. 1a H denotes the Hadamard gate, CX the two-qubit CNOT gate, S the phase gate, I the identity gate, and X, Y, Z the single-qubit Pauli gates. Each qubit may be realised through a physical manifestation which can be placed into at least two different informational quantum states. For example, each qubit may be a superconducting qubit such as a transmon qubit. The quantum system 100 is a physical implementation of the coupled qubits 110 and external drives 120, which provide electrical signals to be applied at the qubits 110.

The evolution of the quantum states of each qubit is influenced by its neighbours through a coupling term, while drive signals can be applied to each qubit individually by the external drives 120. In the illustrated system, the coupling between qubits is fixed and no separate control lines are provided in order to influence that coupling. This reduces complications in fabrication of the system and together with the risk of uncalibrated or uncontrolled influences arises from that fabrication.

For simplicity ZZ coupling is assumed between the qubits, but the description below holds for any coupling that commutes with the qubit's free evolution Hamiltonian. It is noted that an effective ZZ coupling between transmons through their common interaction with a cavity was already demonstrated experimentally, and recently via a flux-tunable coupler. There have also been proposals on realizing ZZ coupling by utilizing the cross Kerr effect between superconducting qubits for the quantum simulation of interacting spin systems. In addition, ZZ coupling is the natural interaction in a nuclear magnetic resonance quantum computer for which sophisticated pulse-shaping is available.

According to the described method, in each time period (i.e. each time step), a selection of the qubits within a given subgroup is driven while the remaining qubits of that subgroup remain passive. In FIG. 1a driven qubits are unshaded while undriven qubits are shaded. The subarray of driven qubits satisfies a set of criteria in order that the array's Hamiltonian can be decomposed into commuting few-qubit blocks, and that the quantum gates are robust against uncertainty in all parameters of the Hamiltonian. Each drive signal can implement a gate on the driven qubit, and through its combination with the fixed qubit-qubit couplings also implements an identity gate on the neighbouring undriven qubits at the same time. In the next step a different subarray is driven for implementing gates on a different set of qubits. In FIG. 1a) CX on two adjacent qubits denotes the CNOT gate and I the identity gate.

Each block (i.e. subgroup of qubits) has a low dimensional Hilbert space and a small number of uncertain parameters, and thus its unitary evolution can be optimized efficiently using robust optimal control algorithms. This decomposition exists when the qubit-qubit coupling term is diagonal in the computational basis, for example the ZZ interaction, and when only a subarray of qubits, chosen based on the quantum gate of interest, is driven, as demonstrated in FIG. 1a.

The choice of the driven subarray should also satisfy the following requirement for making the gates robust against uncertainty in all the qubit-qubit couplings: every undriven qubit should be coupled to at least one driven qubit.

Figure 1B:
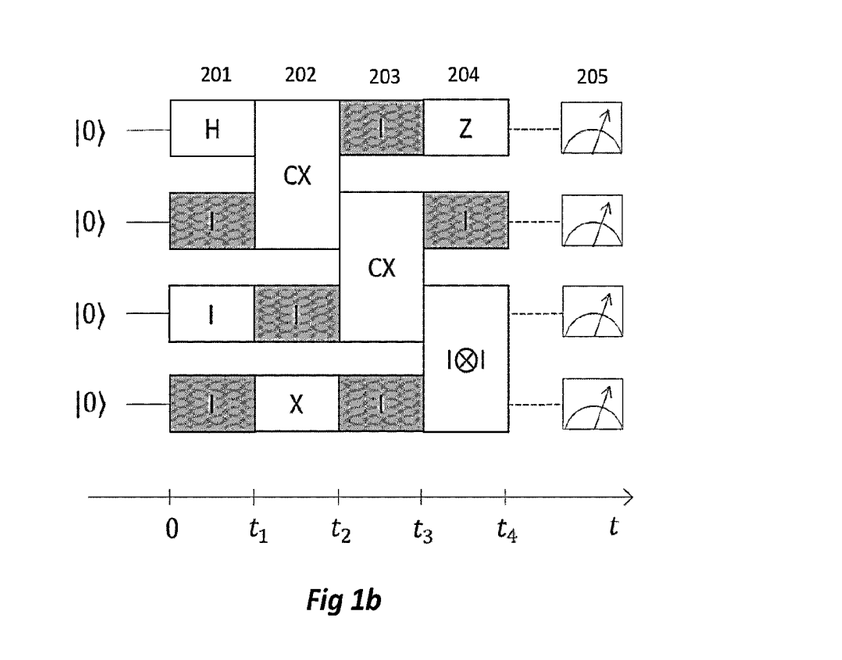

FIG. 1b illustrates the application of a quantum circuit to the quantum system illustrated in FIG. 1a. The circuit comprises a sequence of quantum gates applied to the qubits of the system. Driven qubits at each time step may have a variety of desired quantum gates applied, while the undriven qubits, as will be explained below, have the identify gate applied through their coupling to the driven qubits. For each qubit (which may be driven and undriven at different time steps) any idle interval between gates is therefore filled with an active identity gate, preventing evolution due to couplings. As such, it is not necessary to inhibit couplings completely in order to maintain qubit states.

FIG. 1b shows the gates applied at time steps 201, 202, 203, 204 and a measurement phase 205. The four horizontal lines across the time steps represent four qubits, with the qubit being unshaded during a driven time step and shaded in a time step where it is undriven. I represents the identity gate, H the Hadamard Gate, CX the CNOT gate, and Z the Pauli-Z gate. As can be seen, the identity gate I is applied to all undriven qubits in a given time step—this is achieved via the coupling to the driven qubits in that time step.

Figure 4:
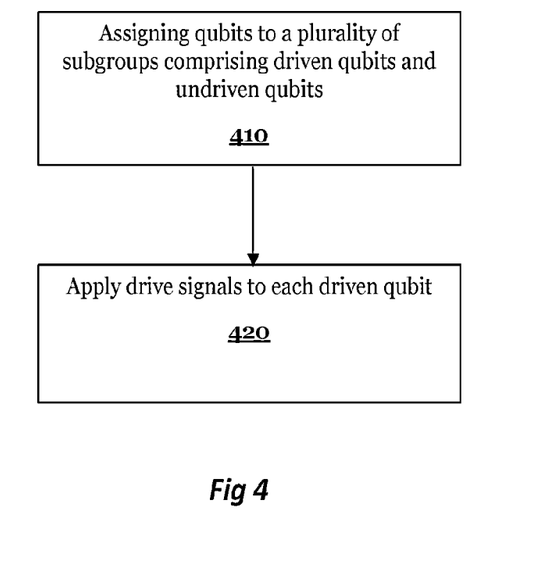
FIG. 4 illustrates a process for applying drive signals to a quantum system comprising a plurality of qubits.
Figure 5:
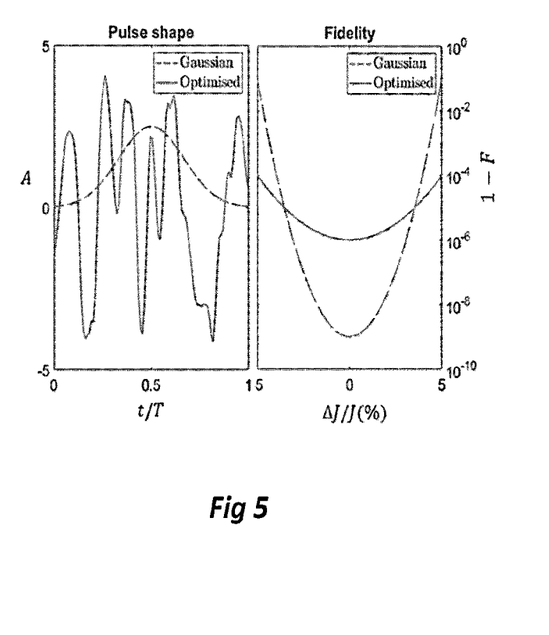
FIG. 5 shows an example of a fidelity for a quantum operation that depends on an uncertain parameter.

FIG. 4 provides a flow diagram illustrating the process for applying quantum operations to a quantum system comprising an array of qubits. Firstly, at step 410, qubits within the overall array are assigned to subgroups in such a way that each undriven qubit in a subgroup is coupled to a driven qubit in that subgroup and such that any two adjacent subgroups share at least one undriven qubit and do not share any driven qubits. Subsequently, drive signals are applied to the driven qubits in order to implement a set of desired quantum gates at the driven qubits. While no drive signals are applied to the undriven qubits, the coupling between these qubits and the driven qubits is utilised in order that the drive signals applied to the driven qubits are also effective to apply the identity gate to the undriven qubits, as illustrated in FIGS. 1a and 1b.

In order to further understand the principles outlined above, consider a system of qubits coupled by fixed nearest-neighbour longitudinal interaction, i.e., an interaction that commutes with the bare qubit's Hamiltonian. For simplicity we choose the ZZ interaction. While this example is chosen to aid understanding, alternative systems and couplings may also be adopted to implement the techniques described herein. In the described example, when a subset of qubits is driven by external fields, the system's Hamiltonian is $$\mathcal{H}(t) = -\sum_j \frac{\omega_j}{2}\sigma_j^z + \sum_{j\in\mathcal{L}} d_j E_j(t)\sigma_j^x + \sum_{jk} J_{jk}\sigma_j^z\sigma_k^z,$$

$$E_j(t) = E_j^x(t)\cos(\nu_j t) + E_j^y(t)\sin(\nu_j t),$$

where $v_j$ is the frequency of the drive on the j-th qubit, $E_j^x(t)$ and $E_j^y(t)$ the two quadratures of the field, $d_j$ the j-th qubit's dipole matrix element, and $\mathcal{L}$ the driven subset. Typically, the qubit's transition energy, $\omega_j$, is much larger than the interaction, $J_{jk}$, and hence $|0, 0, \ldots, 0\rangle$ is the ground state of the undriven Hamiltonian and can be initialised by cooling.

In the frame rotating with the qubits' frequencies, described by the unitary transformation $$U_0(t) = e^{i\sum_j \frac{\omega_j}{2}\sigma_j^z t},$$

the Hamiltonian in the rotating wave approximation is $$H(t) \approx \sum_{j\in\mathcal{L}} \frac{1}{2}\left[\Omega_j(t)\sigma_j^x + \Omega_j'(t)\sigma_j^y\right] + \sum_{jk} J_{jk}\sigma_j^z\sigma_k^z, \quad (1)$$

where $$\Omega_j(t) = \Omega_j^x(t)\cos(\delta_j t) + \Omega_j^y(t)\sin(\delta_j t), \quad (2)$$

$$\Omega_j'(t) = \Omega_j^y(t)\cos(\delta_j t) - \Omega_j^x(t)\sin(\delta_j \cdot t).$$

Here, $\Omega_j^{x,y}(t) \equiv d_j E_j^{x,y}(t)$ is the Rabi frequency and $\delta_j \equiv v_j - \omega_j$ is the detuning. Computing the unitary evolution of a many-body Hamiltonian like H(t) is in general intractable due to the exponential complexity of the wave function, unless one can decompose the Hamiltonian into a sum commuting few-qubit blocks, i.e., $H(t)=\Sigma_l H_l(t)$, where all the $H_l(t)$ are mutually commuting. The unitary evolution after a time duration T is then $U(T)=\Pi_l U_l(T)$ where $U_l(T) = \mathcal{T} e^{-i\int_0^T dt' H_l(t')}$ and $\mathcal{T}$ is the time-ordering operator. $U_l(T)$ can be efficiently computed since it involves only a few qubits. The $U_l(T)$ factors are also mutually commuting and can be seen as parallel quantum gates applied on separate qubit blocks.

By adopting the techniques described herein, a pattern of driving that enables the decomposition of H(t) into few-qubit commuting blocks can be derived. The driving pattern may also allow using optimal control to make the final unitary robust against the uncertainties in the qubit-qubit and drive-qubit coupling.

Figure 2A:
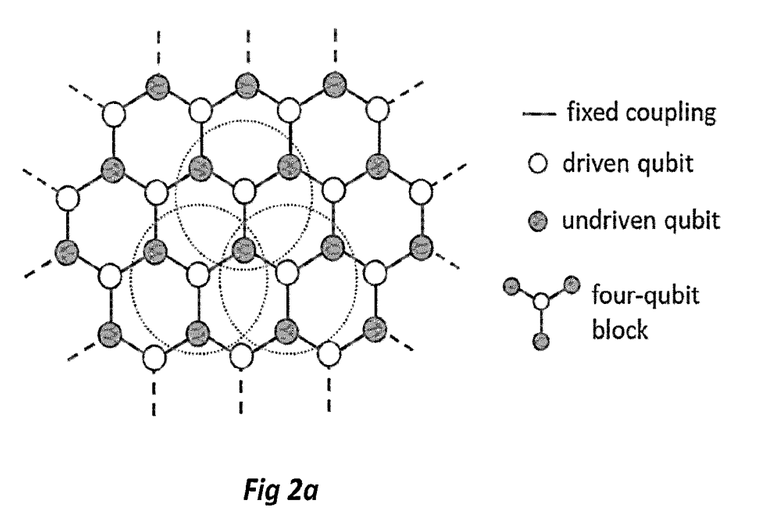
FIG. 2a illustrates 4-qubit subgroups within a honeycomb array of qubits.

For example, an arbitrarily large honeycomb lattice of qubits can be considered with nearest neighbour ZZ coupling and an alternating pattern where only the unshaded subarray of qubits in FIG. 2a is driven. Accordingly, $H(t)=\Sigma_{j\in\mathcal{L}} H_j(t)$ where $\mathcal{L}$ is the driven subarray and $$H_j(t) = \frac{1}{2}\left[\Omega_j(t)\sigma_j^x + \Omega_j'(t)\sigma_j^y\right] + \sum_{k\in NB_j} J_{jk}\sigma_j^z\sigma_k^z, \quad (3)$$

where $NB_j$ is the set of the three nearest neighbors of qubit j. Each of the building block $H_j$ involves four qubits and the blocks commute with each other. This can be seen in a more transparent way by a graphical representation of the Hamiltonian in FIG. 2a. Each link in the graph represents a ZZ coupling term; an unshaded vertex represents a single-qubit driving term, and a shaded vertex represents an undriven qubit and hence adds nothing to H(t). All the ZZ terms commute with each other, and a driven vertex does not commute with only the three links connecting to it, because $\sigma^x$ and $\sigma^y$ does not commute with $\sigma^z$. Thus, the total Hamiltonian can be expressed as a sum of commuting four-qubit blocks enclosed by the dash circles in FIG. 2a. Each block has only one driven qubit in the centre. The qubit at the intersection of two neighbouring blocks is not driven, allowing commutativity to hold. As described in more detail below, it is possible to implement a robust single-qubit gate on the driven qubits without changing the state of the undriven qubits despite the permanent ZZ interaction in the block.

Figure 2B:
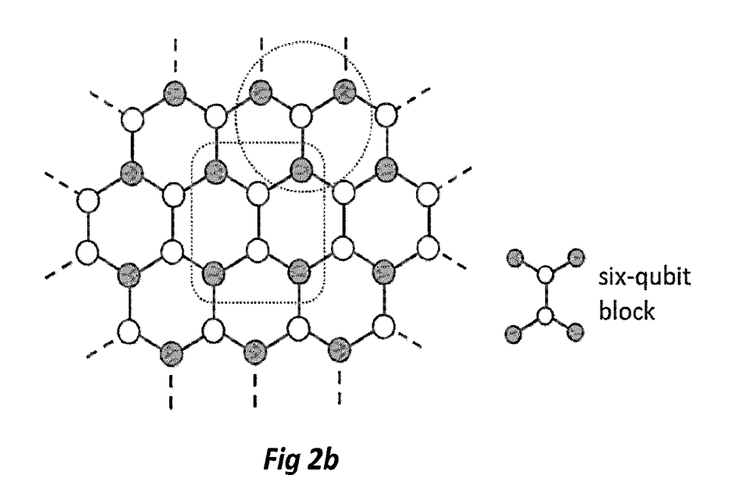
FIG. 2b illustrates 6-qubit subgroups, including two driven qubits, within a honeycomb array of qubits

In a conventional device with tunable couplers the interaction between adjacent qubits may be turned on only when a two-qubit entangling gate is needed. In the embodiments illustrated in the accompanying Figures in contrast, the ZZ coupling is always on, and in general it entangles all the qubits at all times. However, by adopting the described techniques it is still possible to implement a specific two-qubit entangling gate, for example, the CNOT gate, between two targeted qubits by driving both of them (more details below). Turning on the drives on two neighbouring qubits results in the pattern of FIG. 2b where the central row is built from identical six-qubit blocks. The rest of the lattice can be driven as before. The skilled person will note that a six-qubit block is proposed in this example while only one two-qubit gate is applied. This is to satisfy a condition for robust control: every link (ZZ term) should be connected to at least one driven qubit. The pattern shown in FIG. 2b is a simple approach to meeting these criteria. If a link, $J_{jk}\sigma_j^z\sigma_k^z$, is not connected to any driven qubit, then it commutes with every other terms in the Hamiltonian, and its contribution to the total unitary evolution is simply the factor $e^{-iJ_{jk}\sigma_j^z\sigma_k^z T}$, an in the absence of further control it cannot be made robust against uncertainty in $J_{jk}$.

Figure 2C:
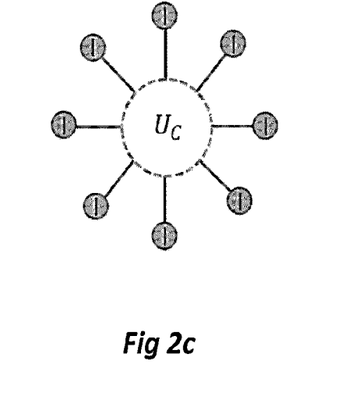
FIG. 2c illustrates a general subgroup arrangement, having one or more driven qubits at the centre coupled to undriven qubits on the periphery.

The beneficial robustness of the approach described herein can be understood with respect to the key numerical finding that, for a star graph where the undriven qubits on the boundary are connected to a central subset of driven qubits (see FIG. 2c), it is possible to realize an operation of the type $U_C \otimes I_B$ where $U_C$ is a unitary acting on the driven subset, and $I_B$ is the identity matrix acting on the undriven subset at the boundary. This means that the gate $U_C$ is applied to the driven subset while the rest remains undisturbed. Obviously, these qubits on the boundary are acted on by the ZZ interactions during the gate, but we find that by choosing the right pulse shape one can use the combined effect of the central driving terms and the ZZ connectors to ensure that the identity is applied to the boundary (i.e., to the undriven qubits) at the end of the pulse. Therefore, the ZZ interactions are effectively removed in a stroboscopic fashion. If the driven subset has one (two) qubit, $U_C$ is a single-qubit (two-qubit) gate. Moreover, $U_C \otimes I_B$ can be realized with high fidelity despite significant uncertainty in all the ZZ couplings, $J_j$, all drive-qubit Rabi couplings, $\Omega_j^{x,y}$, and all the detunings, $\delta_j$ in the graph's Hamiltonian. The four and six-qubit blocks of FIGS. 2a to 2c are star graphs with one and two driven qubits in the centre, respectively. An implementation of quantum computation on the array is demonstrated in FIG. 1 where the driving subarray is shifted from one step to the next to apply the target quantum gate on the right qubits. If there is no other gate applied to a qubit in a given step one applies the active identity gate to keep the state of this qubit unchanged.

In robust optimal control, the pulse duration, T, may be divided into M time bins of interval $\Delta t$. In each time bin the field amplitudes are kept constant. The set of the Rabi frequencies form the control vector, $c=\{\Omega_{jn}^\mu: 1\leq n\leq M; \mu=x, y; j\in\mathcal{C}\}$, where $\mathcal{C}$ is the driven subset. The unitary evolution $U_g(T)$ of the star graph $\mathcal{G}$ is then a function of c. Each qubit-qubit coupling, $J_{jk}$, and detuning, $\delta_j$, is allowed to vary independently in the uncertainty intervals $[\bar{J}-\Delta J/2, \bar{J}+\Delta J/2]$, and $[\bar{\delta}-\Delta\delta/2, \bar{\delta}+\Delta\delta/2]$, respectively. The uncertainty in the Rabi frequencies can be caused by that in the dipole-matrix elements, or a slow drift in the drive leading to changes in the field amplitudes from one experiment to the next. This can be modelled by replacing $\Omega_j^{x,y}(t)$ in $H_g$ by $\alpha_j\Omega_j^{x,y}(t)$ where $\alpha_j$ is a dimensionless parameter that varies in the interval $[1-\Delta\alpha/2, 1+\Delta\alpha/2]$. Now the unitary $U_g(T)$ also depends on $J_{jk}$, $\alpha_j$ and $\delta_j$. The qubit-qubit couplings and dipole-matrix elements can be measured or estimated at the point of fabrication; this may mean that their values can change substantially after the array was built. In contrast, it is typically possible to determine the frequency of every qubit in the completed array with very precise spectroscopic measurement. In the array the resonant frequency of each qubit is shifted due to the ZZ interactions, but a procedure of one and two-photon absorption measurements can be found that can be combined to cancel these shifts and obtain the bare qubit frequency, $\omega_j$. Thus, it can be assumed that the driving fields are tuned to resonance, $\bar{\delta}=0$, with residual uncertainties that are much smaller than the average qubit-qubit interaction, $\Delta\delta_j/\bar{J}=0.1\%$. This small detuning uncertainty is easily achievable in most physical realizations of qubits owing to highly accurate spectroscopic measurement and excellent qubit's frequency stability.

Denote the set of these uncertain parameters as v, then the robust optimal control problem can be defined as a max-min optimization problem: An optimal control maximizes the minimum fidelity over v, $$\mathcal{F}_{max} = \max_c \mathcal{F}(c), \quad \mathcal{F}(c) = \min_{v \in V} F(c, v), \quad (4)$$

where V is the hypercube containing the possible values of v, and F(c,v) the fidelity based on the trace distance $$F(c, v) = \left| \frac{1}{D} tr\left[ U_g^\dagger(T)(U_C \otimes I_B) \right] \right|^2, \quad (5)$$

where D is the dimension of the Hilbert space of $\mathcal{G}$, $I_B$ the identity matrix of the subset of undriven qubits on the boundary, and $U_c$ the target unitary that is desired to be applied on the central driven subset. In numerical computation one chooses a set of sampling points, $v_i$, in V, and find the minimum fidelity in this set. It is found that when the uncertainties are all smaller than 5% and F(c,v) is larger than 99% its minimum over v always lies at one of the extreme points of V, i.e., one of the corners of the hypercube. Thus, one can redefine $\mathcal{F}(c) \equiv \min_{v_i \in X} F(c,v)$ where X is the discreet set of the extreme points of V. This drastically reduces the number of sampling points where F(c,v) has to be computed. There are $2^{n_u}$ extreme points in a hypercube of $n_u$ uncertain parameters. For example, the 6-qubit block in FIG. 2b has 9 uncertain parameters, five Js, two $\alpha$s, and two $\delta$s, so we need to compute $2^9 \equiv 512$ values of $F(c,v_i)$ for any given c.

The present disclosure provides a numerical computation for gradient-based robust optimal control that can handle systems with up to 12 qubits and multiple uncertain parameters. Starting with a random initial guess for c, gradients can be used to identify a step $\delta c$ to maximize $\min_i \nabla_c F(c,v_i)$. $\delta c$, the first order increment, so that $F(c,v_i)$ is increased for all $v_i$. In this way $\mathcal{F}$ (c), the minimum fidelity over $v_i$, can be increased to a value very close to one. This ensures all the fidelities at the extreme points of the hypercube, V, are increased. This optimization problem can be solved by sequential convex programming (SCP). We used the YALMIP toolbox and SPDT$_3$ package in Matlab for this purpose. If a step can be found such that $\min_i \nabla_c F(c,v_i)$. $\delta c$ is positive then we increase the upper bound uo by 1.15, otherwise we decrease it by 2. These factors were chosen as they gave the fastest convergence in numerical tests. The procedure can be repeated until either the maximum iteration is reached or the step's upper bound drops below a small tolerance.

In practice, it is found that one can also raise $\mathcal{F}$ (c) by maximizing the average fidelity, $\Sigma_{i=1}^{n_X} F(c,v_i)/n_X$, with gradient ascent, which in some cases works faster than trying to increase $F(c,v_i)$ for all $v_i$. For the n-th time bin the time evolution is calculated by the mid-point rule $e^{-iH_g (t_n \Delta t/2)\Delta t} + O(\Delta t^3)$ which is accurate when the time step is small. The matrix exponentiation is sped up by using sparse matrices, and the gradient computed from a simple and efficient second-order formula. Of the two approaches described here (i.e. maximising the minimum value of the set of the gate fidelities calculated at the extreme points of the region of the uncertain parameters or maximising the average fidelity) it has been found that the first algorithm is more sensitive on the initial guesses of the control parameters.

For the four-qubit block of FIG. 2a, optimal pulses to realize $U_C \otimes I_B$ where $U_C$ is the Hadamard and $\pi/8$ gates are derived. For the six-qubit block of FIG. 2b, $U_C$ is to be the CNOT gate. These three gates form a universal set where any multi-qubit unitary can be approximated from with arbitrary precision, allowing universal quantum computing on the array. For a system with exclusively fixed coupling, it is also necessary to implement the identity gate that keeps all the qubits in a block unchanged despite the permanent interaction.

Figure 3:
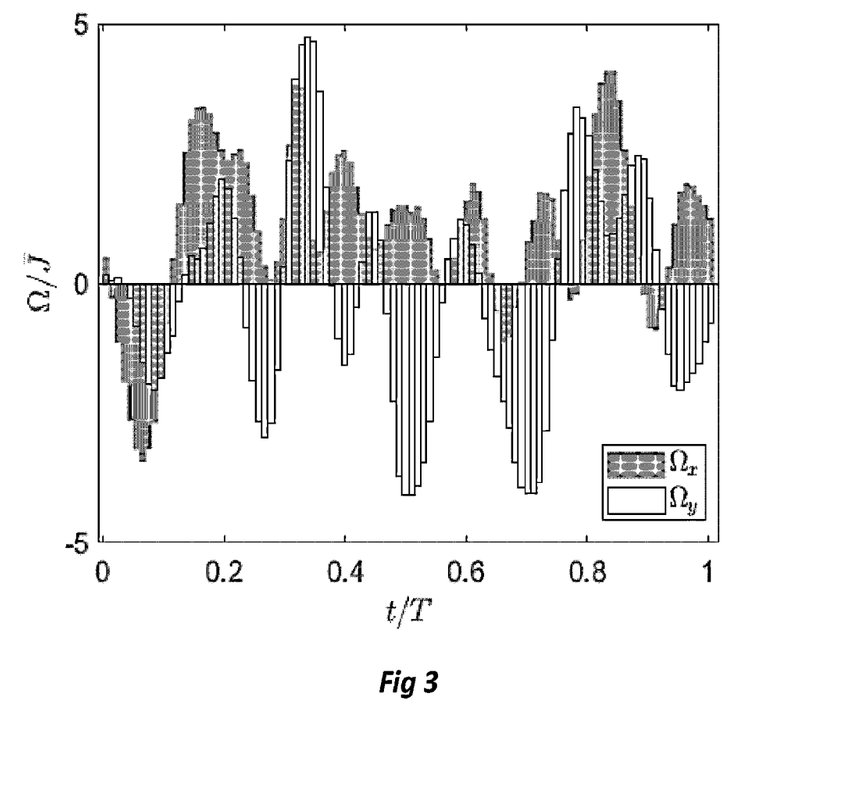

Table 1 illustrates the robust fidelities obtained for the universal set and the identity gates at various levels of uncertainty. The gate duration is divided into M=100 time bins. For 1% uncertainty the fidelity is higher than 99.999% for the single-qubit gates and exceeds 99.98% for the two-qubit gates. Even if the uncertainty is as high as 5% five-nines fidelities are still achieved for the single-qubit gates, and above 99.94% for the two-qubit gates. This can be improved by increasing the number of initial guesses, relaxing the constraints or raising the number of control variables. An example of an optimal pulse shape for a Hadamard gate at 1% uncertainty is shown in FIG. 3. The shape is designed for achieving robustness, i.e., the gate has high fidelity despite substantial uncertainty in the physical parameters of the subgroup and the control. In the illustrated approach, $T=2\pi/\bar{J}$ but this specific value of the duration is not essential; the same order of magnitudes are achieved for the fidelities when T is changed by 10%. In order to see the effectiveness of robust optimal control Table 1 also illustrates calculated fidelities with non-robust optimal control: to calculate these firstly all the uncertainties are neglected and the fidelity is optimised for the ideal case where $J_j=\bar{J}$, $\alpha_j=1$ and $\delta_j=0$ for all j, and then the obtained optimal control, $c_{ideal}$, is used to calculate the minimum fidelity in the hypercube, $\mathcal{F} = \min_{v \in V} F(c_{ideal}, v)$. The results are shown in the parentheses of Table I. robust optimization improves the fidelities by two to three nines when the uncertainties are significantly large (1% and 5%).

TABLE 1

| ΔJ/J | Δα | Had. | π/8 | I | CNOT | I ⊗ I |
|------|------|----------|----------|----------|----------|----------|
| 0.1% | 0.1% | 5.6 (4.5) | 5.5 (4.6) | 5.5 (4.7) | 4.4 (4.1) | 4.6 (4.3) |
| 1%   | 1%   | 5.6 (2.8) | 5.5 (2.7) | 5.6 (2.7) | 3.7 (2.4) | 4.2 (2.3) |
| 5%   | 5%   | 5.3 (1.4) | 5.3 (1.2) | 5.4 (1.1) | 3.2 (1.1) | 4.0 (0.9) |

Robust fidelities for the single-qubit and two-qubit gates on the building blocks of FIG. 2a and 2b, calculated at three levels of uncertainty in ΔJ and Δg. The uncertainty in the detuning is kept at δ/J = 0.1%. The maximum amplitude of the Rabi frequencies is constrained to less than 10J. I and I ⊗ I are the identity gates for the driven subsets of the four-qubit and six-qubit building block, respectively. The gate duration is T = 2π/J, divided into M = 100 time bins. The figures shown are the exponents of the infidelity, i.e., $-\log_{10}(1 - \mathcal{F}_{max})$, which is the number of nines in $\mathcal{F}_{max}$. The figures inside the bracket are results obtained with non-robust optimization.

Readout for the array is now discussed. At the end of the computation the drives are turned off and the system evolves according to the background Hamiltonian $H_0 = \Sigma_{j,k} J_{j,k} \sigma_j^z \sigma_k^z$. The final wave function can be expanded in the computational basis, $|\psi_f\rangle = \Sigma_{j_1, \ldots, j_N = 0,1} c_{j_1, \ldots, j_N} |j_1, \ldots, j_N\rangle$. Since $H_0$ consists of exclusively $\sigma^z$ terms, $|j_1, \ldots, j_N\rangle$ is an eigenstate of $H_0$ and the evolution under $H_0$ introduces only addition phases in the coefficients $c_{j_1, \ldots, j_N}$. Thus, if the solution of a computation is encoded in the bit string of the final wavefunction, as is the case for the Shor's algorithm for factoring and the HHS algorithm for solving linear systems, the additional phase will not change the result. Therefore, the projective measurement onto the computational basis can be done at any time after the drives are turned off. The same projective measurement can also be used to prepare the system in a random state in the set of $2^N$ computational basis vectors, if the readout fidelity is high enough. From the measurement result one knows exactly this state; and it can be used as the starting point of the computation.

Additional techniques for obtaining control/drive signals for application to a quantum system are described with reference to FIGS. 5 to 8. These techniques are based on the tensor network representation of multi-qubit quantum state and can be applied to the methods described in FIG. 1 to 4 or to alternative quantum systems comprising a plurality of qubits with an arbitrary form of qubit-qubit interaction.

As noted above, in complex quantum devices it is impractical/impossible to precisely characterise the physical parameters of every qubit, resulting in some uncertainty with regards to the model of the system. These parameters also change from one experiment to the next due to diffusive processes in the materials. These uncertainties lead to a significant drop in the fidelity, making it challenging for achieving high fidelity and requiring frequent complex in-situ calibration schemes to be performed. This effect becomes rapidly worse with increasing number of uncertain parameters. Therefore, it is important to have a method for quantum operations that is robust against uncertainty in the device's physical parameters.

Ensuring that the control signals themselves are robust to such uncertainties can offer significant benefits in this regard. The present disclosure provides a robust optimal control method/algorithm for multiqubit devices based on tensor networks, an efficient formalism for simulating many-body dynamics. As explained below, this method can be applied to large systems of qubits for quantum computing and metrology applications.

Robust optimal control is a promising technique for fighting the effect of uncertainty/inhomogeneity in a quantum system. By designing an optimal shape for the amplitude and phase of the external drives, it is possible to realise precise quantum operations even when there is substantial uncertainty in both the qubits and the drives. The fidelity is a measure of how close the final operation is to the targeted operation, and is obviously a function of the amplitude, phase, and duration of the external drives, denoted by a multivariable control vector, c. It also depends on the physical parameters of the qubits, denoted by v, which may share some variables with c. Due to the experimental uncertainty in v, the fidelity F(c,v) may vary significantly, see an example in FIG. 5. This figure shows example for a fidelity of a quantum operation that depends on an uncertain parameter J. A standard pulse, in this example Gaussian (dashed line, left panel), can be used for implementing the quantum operation with very high theoretical fidelity when there is no uncertainty, ΔJ=o, (right panel). However, this fidelity is very sensitive on J and drops quickly with ΔJ. Robust optimal control algorithms are used for deforming the initial pulse to an optimal pulse (solid line, left panel), making the fidelity flat in the uncertain variable (right panel), so that it remains sufficiently high for the whole range.

In robust optimal control we seek an optimal pulse for the control to optimise F(c,v) for all values of v in the uncertain region, making sure that the fidelity is high even when the values of v are not known precisely. Mathematically this can be stated as a max-min optimisation problem: Find c to maximise $$\min_{v \in R} F(c, v)$$

where R is the uncertain region containing all the possible values of v.

If the quantum process is a n-qubit gate then $F = |tr(U'^\dagger U)|/2^n|^2$ where n is the number of qubits, U the actual unitary evolution and U' the target unitary evolution. For state preparation the fidelity is simply the overlap $|\langle \psi'|\psi\rangle|^2$ between the final state $|\psi\rangle$ and the target state $|\psi'\rangle$.

As an example, consider a model for an interacting system of many qubits, where a subset of qubits is driven by external controls. The system's Hamiltonian is $$H(t) = -\frac{1}{2}\sum_{j=1}^{n} \Delta_j \sigma_j^z + \sum_{j,k=1}^{n} V_{jk} + \sum_{j \in S}\left(\Omega_j^x(t)\sigma_j^x + \Omega_j^y(t)\sigma_j^y\right),$$

where $\Delta_j$ is the detuning of the j-th qubit, $V_{jk}$ the interaction between the qubits, S the subset of the driven qubits, $\Omega^{x,y}$ the Rabi amplitude of the drive on the x and y channel, and $\sigma^{x,y,z}$ the Pauli matrices. Here the Rabi amplitudes are the control variables, and one usually approximate them by piecewise functions with M time steps where they remain constant during each interval. The control vector c is then the set $\{\Omega_{jm}^\mu : \mu = x,y; 1 \leq j \leq n; 1 \leq m \leq M\}$ and the parameter vector v is the set of all physical parameters in H(t) including $\Delta_j$, $V_{jk}$, and $\Omega_{jm}^\mu$. This interacting model is applicable for multi-qubit solid state devices including superconducting and spin qubits.

To compute the fidelity F of a quantum operation one first needs to simulate the unitary evolution of the multi-qubit system for obtaining the final state. For small systems with up to 16 qubits this can be done simply with exact exponentiation based on the Krylov subspace iteration for sparse Hamiltonians. However, one needs $2^n$ complex numbers to describe the wavefunction of n interacting qubits, $|\psi\rangle = \Sigma_{i_1,i_2,\ldots,i_n=1} c_{i_1,i_2,\ldots,i_n}|i_1,i_2,\ldots,i_n\rangle$. Thus, the amount of memory and time required increases exponentially and becomes prohibitively expensive for large n.

Figure 6:
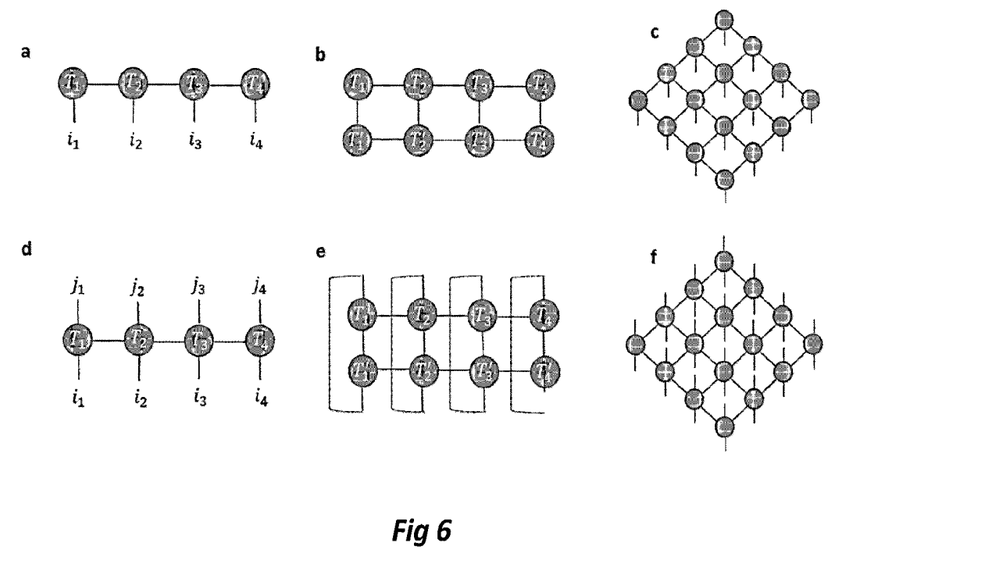
FIG. 6 illustrates tensor network representations of quantum systems.

An advantage of tensor networks (TN) lies in the polynomial scaling of time and memory with the number of qubits, a huge improvement in efficiency. TN is a representation of the wavefunction where each qubit is assigned a tensor (shaded circles in FIG. 6a), and the quantum state is now represented by a mathematical network of tensors. Each leg of a circle in FIG. 6a represents an index of the tensor, so the number of legs is the dimension, or rank, of the tensor. The open leg represents the physical index of the qubit, i.e., it can be only 0 or 1. The connected legs are called virtual indices and can have any size, denoted by D, referred to in the literature as the bond dimension. The coefficients in the computational basis are related to the tensors by $c_{i_1,i_2,\ldots,i_n}$=Contract($T_1^{[i_1]}, T_2^{[i_2]}, \ldots, T_n^{[i_n]}$) where $T_j$ is the tensor of the j-th qubit and the superscript is the open index. Here "Contract" means the contraction of all the connected indices in the network. In the simplest case the tensors have rank 2, i.e., they are matrices, and tensor contraction simply reduces to matrix multiplication. Storing a tensor network requires only $2nD^r$ complex numbers where r is the number of virtual indices and D the bond dimension. The fidelity of a state preparation process can be calculated efficiently by contracting a network constructed from the tensors of the actual state with that of the target state, as in FIG. 6b.

A n-qubit unitary gate can also be represented by a tensor network, in general any such gate can basis be expanded in the computational basis as $U=\Sigma_{i_1,i_2,\ldots,i_n,j_1,j_2,\ldots,j_n=0,1}$ $c_{i_1,i_2,\ldots,i_n}^{j_1,j_2,\ldots,j_n}|i_1,i_2,\ldots,i_n\rangle\langle j_1,j_2,\ldots,j_n|$. The 2n-rank tensor $c_{i_1,i_2,\ldots,i_n}^{j_1,j_2,\ldots,j_n}$ can be represented by a tensor network, for example the 1D network of FIG. 6d. The fidelity of a unitary gate can be calculated by contracting a network constructed from the tensors of the gate with that of the target gate, as shown in FIG. 6e. For the case of 1D tensor networks in FIGS. 6b and 6e, contracting the networks costs $O(nD^3)$.

To summarise FIG. 6, this Figure shows: a) A one-dimensional (1D) tensor network for the state of a system of 4 qubits: The number of legs of a tensor, represented by a shaded circle, is the number of its indices, or rank. An open leg represents a physical qubit index which can be 0 or 1. A connected leg is a virtual index and can have any size. Connected indices are contracted to obtain the coefficients of the state in the computational basis. b) A diagram of tensor network contraction for computing the state preparation fidelity $\langle\psi'|\psi\rangle$. c) A 2D tensor network for the state of 16 qubits. d) A 1D tensor network for a unitary gate of 4 qubits. Compared with that of a state, a tensor network for a gate has twice the number of physical indices. e) A diagram of tensor network contraction for computing the gate fidelity tr($U'^\dagger U$). e) A 2D tensor network for a gate of 16 qubits.

Figure 7:
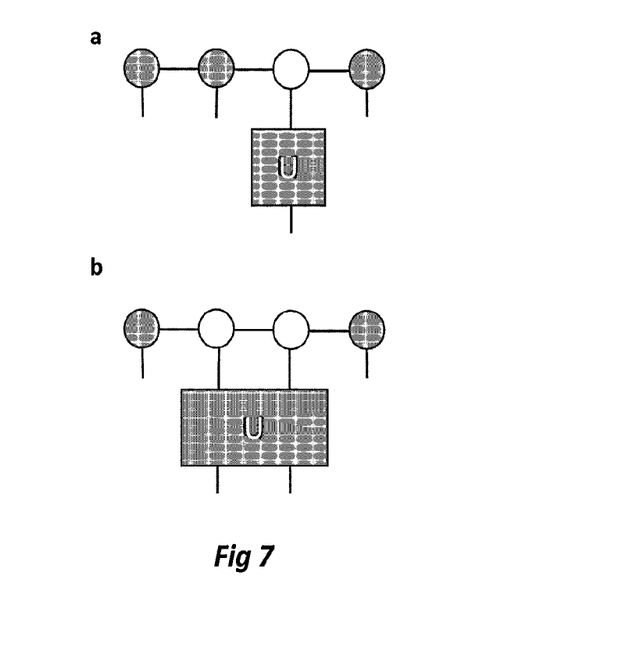
FIG. 7 illustrates applying a (a) single qubit operator and (b) two-qubit operator to a tensor network state by contracting the corresponding tensor of the operator.

To obtain the actual state or unitary one needs to simulate the time evolution of the system during the application of the pulses. This can be done with the time evolving block decimation algorithm (TEBD). For a small time step, dt, the unitary evolution of the whole system $e^{-iH(t)dt}$ is expanded by the Trotter-Suzuki formula, or an equivalent, to a product of one, two or many-qubit unitary operators. The time evolution of the system during this time step is obtained by contracting these unitary operators to the tensor network of the state, or unitary gate, as depicted by FIG. 7. This Figure illustrates the application of a (a) single qubit operator and (b) two-qubit operator to a tensor network state by contracting the corresponding tensor of the operator, U (shaded rectangles) to the tensors of the targeted qubits (unshaded circles).

For maximising the fidelity, we use an optimal control algorithm, for example the gradient ascent method that updates the control variable by $c \rightarrow c+\lambda\nabla_c F$ where $\nabla_c F$ is the gradient with respect to the control variables and $\lambda$ a step size. For multi-qubit systems we can approximate the gradient by a $1^{st}$ or $2^{nd}$-order formula in the time step, then it can be computed efficiently by sandwiching the tensor network of the fidelity, as in FIGS. 6c and 6e, with a series of one, two, or many-qubit operators. These approximate formulae work well when the time step is sufficiently small.

Figure 8:
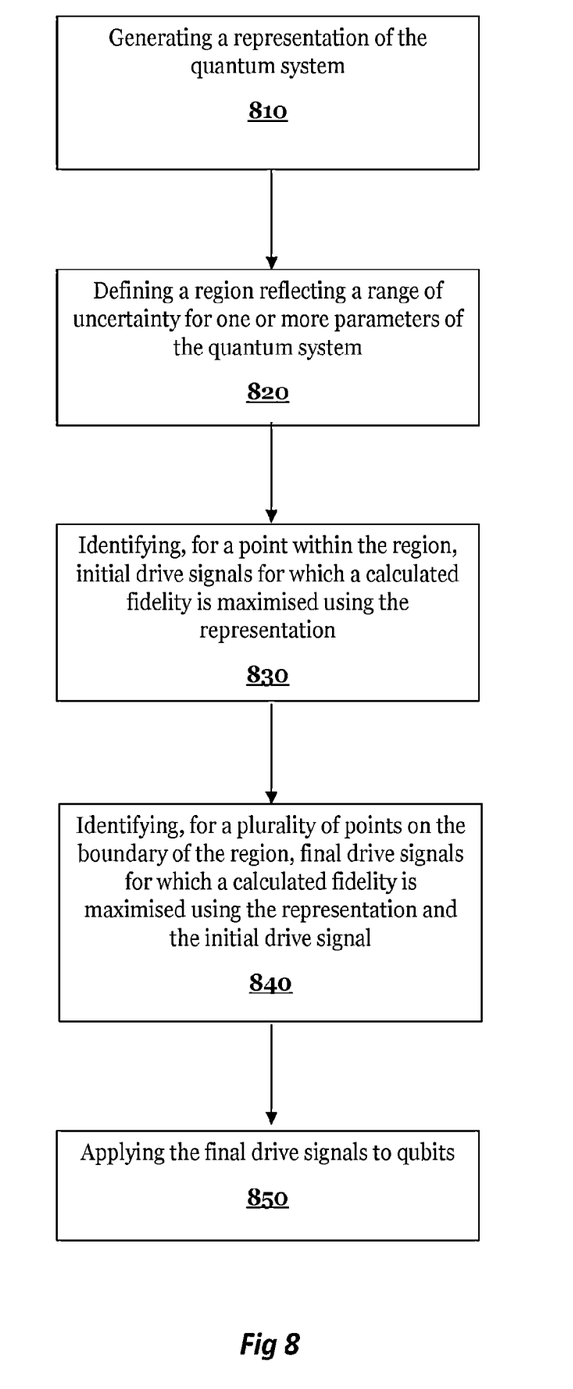
FIG. 8 is a flow diagram of a process for obtaining an optimal control algorithm.

To make the fidelity robust against variation in the uncertain parameters, v, a process can be adopted as reflected in FIG. 8. Firstly, a representation, such as a tensor network representation of the quantum system is obtained at step 810. Subsequently, a region R reflecting uncertainty in the parameters of the system is defined at step 820. Then, a three-step procedure can be adopted to identify drive signals having the desired fidelity:

1) At step 830, the fidelity is optimised at $v=v_0$ where $v_0$ is the center of the uncertain region, R, i.e., we find a control (initial drive signal) $c_1$ such that $F(c_1, v_0) \approx 1$. The function $F(c_1,v)$ now has a local maximum at $v_0$ and one can show that $F(c_1,v)$ is approximately a concave function in R if R is sufficiently small. Hence, the minimum of $F(c_1,v)$ in R lies approximately at the extreme points of R.
2) Next, at step 840, using $c_1$ as the initial value for the control, we optimise the fidelity at the extreme points of R, or a set of points on or near the surface of R, in a way such that the fidelity is high in the whole region of R at the end of the optimisation process. Denote the control at the end of this step (i.e. a final drive signal) $c_2$.
3) Optionally (not illustrated in FIG. 8), verify that the fidelity is indeed high in all of R by sampling the distribution of the fidelity function, $F(c_2,v)$, in R. We do this by calculating the fidelity at points generated uniformly at random in R. The average value, standard deviation and worst-case value of the fidelity is estimated from this distribution.

After these stages the final drive signal or signals are applied to qubits of the system. In this context of FIGS. 1 to 4, for example, these final drive signals will be applied in particular to the driven qubits.

The benefits of an optimal control algorithm of the type described above can be understood with reference to a number of examples, as detailed below.

In a quantum computer with tunable couplers the interaction between the qubits can be turned on and off, however there is usually finite-range residual constant interactions with the qubits nearby. Therefore, to accurately simulate a single or two-qubit gate one need to include many neighbouring qubits in the dynamics. The optimal control algorithm can be applied for designing a relatively smooth pulse, within the allowed bandwidth of the pulse generator, for implementing multi-qubit unitaries. Of particular interest is the realisation of a universal set of quantum gates on a cluster of qubits coupled with residual interactions: A set from which any muti-qubit unitary can be approximated from. This includes the Hadamard gate, the $\pi/8$ gate and the CNOT gate. Note that on a cluster of interacting qubits the ones not involved in a gate must be kept unchanged. A single-qubit Hadamard gate, for example, is actually a multi-qubit gate of the form $H \otimes I \otimes I \ldots \otimes I$ where I is the identity operator. These gates generate low entanglement and hence can be simulated using tensor networks with sufficiently small bond dimension, D.

The approached described herein is also applicable for modular quantum computer architectures where the interaction between the qubits in each module is fixed, i.e., constant in time. In solid state quantum computers, tunable couplers typically involve more circuit elements and require their own external control for tuning the magnitude of the interaction, leading to overheads in fabrication and wiring. For solving real-world problems, a quantum computer may need millions of qubits, and the complexity of the tunable couplers adds to the technological difficulties in scaling up the device. In contrast, fixed couplers, such as capacitive coupling between superconducting qubits, do not require the extra components for controlling the magnitude of the interaction, resulting in a substantial simplification of hardware architecture. In many platforms fixed coupling comes from natural interactions, for example the mutual induction between superconducting qubits and exchange between spins, and hence no parts are necessary for coupling the qubits. Hence for large quantum computers it may be advantageous to have separate modules each with a finite number of qubits where all the couplings are fixed, and tunable coupling is only needed between the modules. In this architecture the optimal control algorithm described above may be very useful for optmising the quantum gates on each module.

Tensor networks with sufficiently small D approximate well multi-qubit states with bounded entanglement. This holds for many states of interest in quantum simulation and metrology, such as ground states of gapped Hamiltonians and the GHZ state. A particularly interesting application is to find the optimal pulse shape of the external drives for preparing the entangled GHZ state the spin-NooN state. These two states are central to quantum metrology as they both allow ultra-sensitive measurement of an external field. In a complex system of many qubits there are many sources of error and low fidelity of the state preparation process is unavoidable. Robust optimal control is a remedy for this problem and will help achieving the optimal $\sim 1/n^2$ Heisenberg bound for the measurement error (variance). Here n is the number of qubits. The Heisenberg limit is a huge improvement over the 1/n classical shot noise limit, allowing ultra-sensitive measurement in circumstances where many repetitions of a measurement are not practical. This has the potential for revolutionising sensing technologies.

Variations and modification of the above-described techniques will be apparent to the skilled person. For example, although a honeycomb lattice has been described in detail, the qubits can be arranged in any physical shape that has the same connectivity, for example a square lattice with each qubit connected to only three nearest neighbours. Moreover, there exist driving patterns that satisfy the conditions of commutativity and robust control for other geometries such as square lattices and one dimensional chains. Similarly, although the above-described approach assumes there is no tunable coupling, the skilled person may also envisage approaches in which tunable coupling is provided or a hybrid architecture where clusters of fixed couplers are connected with tunable couplers, making the control easier while still keeping the number of required tunable couplers low. This has the potential for easing the technological difficulties in scaling up a quantum computer for achieving quantum advantage.

The invention claimed is:
1. A method for controlling a quantum system comprising a plurality of coupled qubits, comprising:
   i) assigning the qubits to a plurality of subgroups, wherein the assigning comprises selecting at least one driven qubit and a plurality of undriven qubits for each subgroup, such that each undriven qubit in a subgroup is coupled to a driven qubit in that subgroup and such that any two adjacent subgroups share at least one undriven qubit and do not share any driven qubit; and
   ii) applying drive signals to each driven qubit to implement a set of desired quantum gates at the driven qubits, wherein the application of the drive signals to the driven qubits at the same time implements the identity gate at each undriven qubit through fixed qubit-qubit coupling.

2. A method according to claim 1, wherein the qubit-qubit coupling has a form such that the Hamiltonians of the subgroups mutually commute.

3. A method according to claim 1, wherein coupling between the qubits comprises ZZ coupling, or any coupling which commutes with the qubit's free evolution Hamiltonian.

4. A method according to claim 1, wherein the plurality of coupled qubits are arranged as a 1D, 2D, or 3D array.

5. A method according to claim 1, further comprising repeating steps i) and ii) to implement a further set of desired quantum gates.

6. A method according to claim 5, wherein repeating step i) comprises selecting different driven qubits.

7. A method according to claim 5, wherein the drive signals from an earlier iteration of step ii) continue to be applied until the drive signals from a subsequent iteration of step ii) are applied.

8. A method according to claim 1, wherein the set of desired quantum gates comprises the Hadamard gate, the π/8 gate, the identity gate, and the CNOT gate.

9. A method according to claim 1, wherein the set of desired quantum gates may comprise at least one two-qubit gate.

10. A method according to claim 1, wherein the drive signals are obtained by:
   generating a representation of the quantum system;
   defining a region reflecting a range of uncertainty for one or more parameters of the quantum system;
   identifying, for a point within the region, initial drive signals for which a calculated fidelity is maximised using the representation;
   identifying, simultaneously for a plurality of points on the boundary of the region, final drive signals for which a calculated fidelity is maximised using the and the initial drive signal,
   wherein the final drive signals are applied to the driven qubits.

11. A method according to claim 10, wherein the representation of the quantum system is a tensor network representation.

12. A method according to claim 10, further comprising, prior to applying the final drive signals to the driven qubits:
   calculating the fidelity of the final drive signals at one or more further points within the region; and
   determining a distribution of the fidelity across the region from the calculated fidelities.

13. A method according to claim 10, wherein the step of identifying the initial drive signals comprises utilising a gradient ascent/descent method.

14. A method according to claim 10, wherein the step of identifying the final drive signals comprises utilising a gradient ascent/descent method starting from the initial drive signals.

15. A method according to claim 1, further comprising:
iii) measuring the state of at least one of the qubits.

16. A method according to claim 1, wherein the qubits are superconducting qubits.

17. A method according to claim 16, wherein the qubits are transmon or flux qubits.

18. A method for obtaining drive signals to be applied to a quantum system comprising a plurality of qubits, the method comprising:
   generating a representation of the quantum system;
   defining a region reflecting a range of uncertainty for one or more parameters of the quantum system;
   identifying, for a point within the region, initial drive signals for which a calculated fidelity is maximised using the representation;
   identifying, simultaneously for a plurality of points on the boundary of the region, final drive signals for which a calculated fidelity is maximised using the representation and the initial drive signal,
   wherein the final drive signals are applied to one or more qubits.

19. A computer program product comprising computer executable instructions which, when the instructions are executed by a computer, cause the computer to carry out the method according to claim 18.

* * * * *